United States Patent
Zhou et al.

(10) Patent No.: US 11,074,484 B2
(45) Date of Patent: Jul. 27, 2021

(54) SELF-IMPROVING TRANSFERRING IN BOT CONVERSATION

(71) Applicant: International Business Machines Corporation, Armonk, NY (US)

(72) Inventors: Xin Zhou, Beijing (CN); Jie Ma, Beijing (CN); Hao Chen, Beijing (CN); Rachel Mohammed, Woburn, MA (US); Christopher Jonathan Davis, Boulder, CO (US); Zach Shu, Malden, MA (US); Sharath Kancharla, Malden, MA (US); Manon Knoertzer, Somerville, MA (US); Ran Guan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 16/264,149

(22) Filed: Jan. 31, 2019

(65) Prior Publication Data
US 2020/0250489 A1    Aug. 6, 2020

(51) Int. Cl.
*G06K 9/62* (2006.01)
*H04L 12/58* (2006.01)
(Continued)

(52) U.S. Cl.
CPC .......... *G06K 9/6263* (2013.01); *G06F 40/30* (2020.01); *G06K 9/6257* (2013.01); *G06N 3/006* (2013.01);
(Continued)

(58) Field of Classification Search
CPC ......... H04L 51/02; G10L 15/22; G10L 25/63; G06N 3/006; G06N 3/02; G06N 3/0445; G06F 40/30; G06K 9/6263; G06K 9/6257
See application file for complete search history.

(56) References Cited

U.S. PATENT DOCUMENTS

| 5,371,807 | A  | * | 12/1994 | Register | ................ G06F 16/353 382/159 |
| 6,219,657 | B1 | * | 4/2001  | Hatayama | .......... G06K 9/00335 706/14 |

(Continued)

FOREIGN PATENT DOCUMENTS

WO    2017192684 A1    11/2017

OTHER PUBLICATIONS

"Transition conversations from bot to human," Bot Service, Microsoft Docs, Dec. 13, 2017, 5 pages.
(Continued)

*Primary Examiner* — Eric Yen
(74) *Attorney, Agent, or Firm* — Amin, Turocy & Watson, LLP

(57) ABSTRACT

A computer implemented method, computer system and computer program product are provided for transferring in a BOT conversation. According to the method, a user input is received, by a device operatively coupled to one or more processing units, from a user. A first response from a conversation BOT responding to the user input is obtained by the device. The first response is evaluated by the device according to configured rules to determine whether a human agent is needed, wherein the evaluation according to at least one of the configured rules is carried out by a trained engine of a reinforcement learning model. Finally, responding to determine the human agent is needed, a transferring recommendation is sent to the user by the device.

17 Claims, 6 Drawing Sheets

(51) Int. Cl.
*G06N 3/02* (2006.01)
*G06N 3/04* (2006.01)
*G06F 40/30* (2020.01)
*G06N 3/00* (2006.01)
*G10L 15/22* (2006.01)

(52) U.S. Cl.
CPC ............. *G06N 3/02* (2013.01); *G06N 3/0445* (2013.01); *G10L 15/22* (2013.01); *H04L 51/02* (2013.01)

(56) References Cited

U.S. PATENT DOCUMENTS

| | | | | |
|---|---|---|---|---|
| 6,882,973 | B1* | 4/2005 | Pickering | G10L 15/22 379/88.02 |
| 7,231,343 | B1* | 6/2007 | Treadgold | G06F 40/247 704/9 |
| 8,452,668 | B1* | 5/2013 | Peterson | G06Q 30/0631 705/26.7 |
| 9,575,563 | B1* | 2/2017 | Li | G06F 3/03547 |
| 9,582,757 | B1* | 2/2017 | Holmes | G06N 3/006 |
| 9,621,728 | B2 | 4/2017 | McCormack et al. | |
| 9,984,386 | B1* | 5/2018 | Bhatia | G06Q 30/0241 |
| 10,049,301 | B2* | 8/2018 | Kluckner | G16H 40/67 |
| 10,171,662 | B1 | 1/2019 | Zhou et al. | |
| 10,339,919 | B1* | 7/2019 | Raux | G06N 3/0454 |
| 10,387,463 | B2* | 8/2019 | Campbell | G10L 15/1822 |
| 10,469,665 | B1* | 11/2019 | Bell | H04L 67/22 |
| 10,554,817 | B1* | 2/2020 | Sullivan | G06N 5/02 |
| 10,742,571 | B2* | 8/2020 | Uppala | H04L 51/18 |
| 2002/0116350 | A1* | 8/2002 | Hodjat | G06N 5/043 706/11 |
| 2009/0245500 | A1* | 10/2009 | Wampler | H04M 3/5191 379/265.09 |
| 2011/0125697 | A1* | 5/2011 | Erhart | G06Q 30/0256 706/47 |
| 2011/0141919 | A1* | 6/2011 | Singh | H04L 41/0681 370/252 |
| 2013/0317820 | A1* | 11/2013 | Xiao | G10L 15/01 704/236 |
| 2015/0220068 | A1* | 8/2015 | Goldman-Shenhar | G06K 9/00355 700/29 |
| 2017/0132207 | A1* | 5/2017 | Goldstein | G06F 40/30 |
| 2017/0147554 | A1* | 5/2017 | Chen | G06F 3/167 |
| 2017/0324866 | A1* | 11/2017 | Segre | H04L 51/046 |
| 2018/0007102 | A1* | 1/2018 | Klein | H04L 65/1026 |
| 2018/0054464 | A1* | 2/2018 | Zhang | H04L 65/1096 |
| 2018/0129942 | A1* | 5/2018 | Bell | G06F 16/3329 |
| 2018/0165691 | A1* | 6/2018 | Heater | G06F 40/205 |
| 2018/0189609 | A1* | 7/2018 | Park | G06K 9/00979 |
| 2018/0336269 | A1* | 11/2018 | Dobrynin | G06F 9/451 |
| 2019/0037077 | A1* | 1/2019 | Konig | H04M 3/527 |
| 2019/0043483 | A1* | 2/2019 | Chakraborty | G10L 15/16 |
| 2019/0089656 | A1* | 3/2019 | Johnson, Jr. | G10L 15/222 |
| 2019/0095786 | A1* | 3/2019 | Carbune | G06Q 30/0202 |
| 2019/0098136 | A1* | 3/2019 | Odinak | H04L 51/02 |
| 2019/0102707 | A1* | 4/2019 | Wald | G06F 16/285 |
| 2019/0114321 | A1* | 4/2019 | Lam | G06F 40/284 |
| 2019/0227822 | A1* | 7/2019 | Azmoon | G06F 40/35 |
| 2019/0258949 | A1* | 8/2019 | Reyes | G06Q 30/0631 |
| 2019/0378506 | A1* | 12/2019 | Garikapati | G10L 15/1815 |
| 2019/0385597 | A1* | 12/2019 | Katsamanis | G06N 3/04 |
| 2020/0081939 | A1* | 3/2020 | Subramaniam | G06N 5/022 |

OTHER PUBLICATIONS

"Transferring chat to a human agent using Microsoft Bot Framework," F5, Mar. 28, 2017, 29 pages.

Mell et al., "The NIST Definition of Cloud Computing," National Institute of Standards and Technology, Sep. 2011, Special Publication 800-145, U.S Department of Commerce, 7 pages.

"Method and Apparatus to support auto-switch from virtual agent to human agent in call center," Feb. 7, 2017, IPCOM000249109D, 6 pages. https://priorart.ip.com/IPCOM/000249109.

* cited by examiner

SELF-IMPROVING TRANSFERRING IN BOT CONVERSATION

BACKGROUND

One or more embodiments of the present invention relates to information processing, and more specifically, to self-improving transferring in a chatbot conversation.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

A chat robot (or chatbot) (referred to as "BOT" hereinafter) is a computer program or an artificial intelligence that can conduct a conversation via auditory or textual methods. Conversation BOTs are increasingly widely used in multiple areas, such as customer service, product selling, information consulting, etc., to replace human agents for cost saving and efficiency improvement.

However, conversation BOTs cannot totally replace human agents due to their shortage in handling un-designed scenarios, understanding complex user presentations, and appeasing users with negative emotions. Therefore, conversational BOT and human agent will co-exist for satisfying conversation experience and task accomplishment for a long time.

According to one embodiment of the present invention, there is provided a computer-implemented method. The computer-implemented method, comprises: receiving, by a device operatively coupled to one or more processing units, a user input from a user; obtaining, by the device, a first response from a conversation BOT responding to the user input; evaluating, by the device, the first response according to configured rules to determine whether a human agent is needed, wherein the evaluation according to at least one of the configured rules is carried out by a trained engine of a reinforcement learning model; and sending, by the device, a transferring recommendation to the user in response to determining the human agent is needed, In yet another illustrative embodiment, a system is provided. The system can comprise: a memory that stores computer executable components; and a processing unit that executes the computer executable components stored in the memory, wherein the computer executable components comprise at least one computer-executable component that: receives a user input from a user; obtains a first response from a conversational BOT responding to the user input; evaluates the first response according to configured rules to determine whether a human agent is needed, wherein the evaluation according to at least one of the configured rules is carried out by a trained engine of reinforcement learning model; and sends a transferring recommendation to the user in response to determining the human agent is needed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
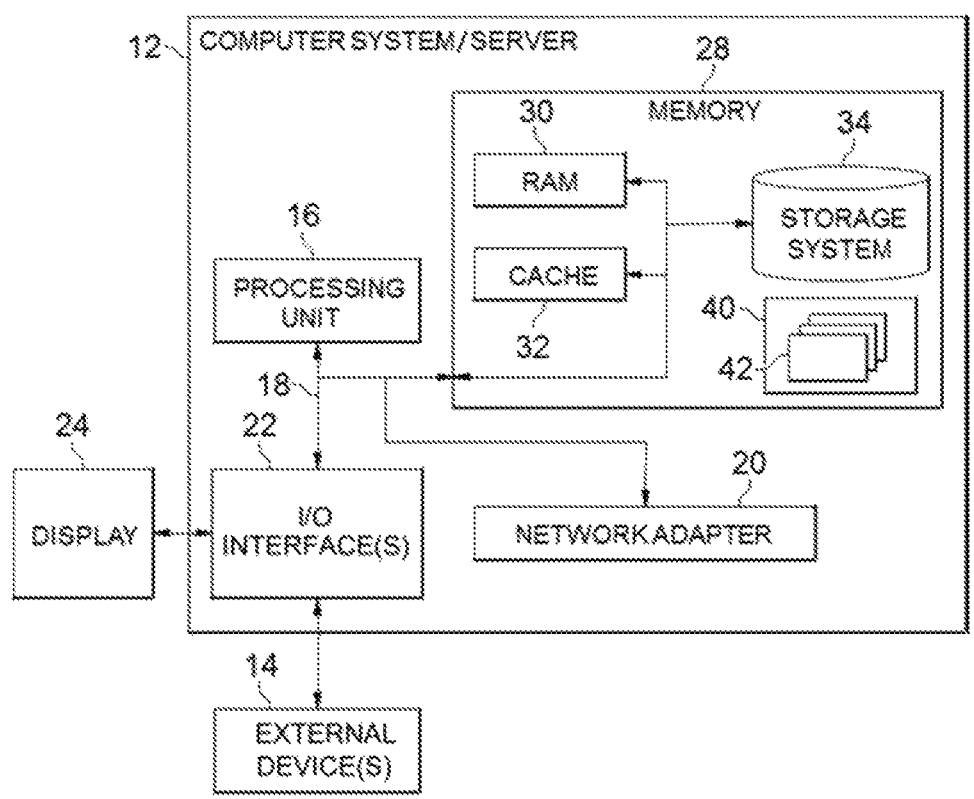
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component. Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
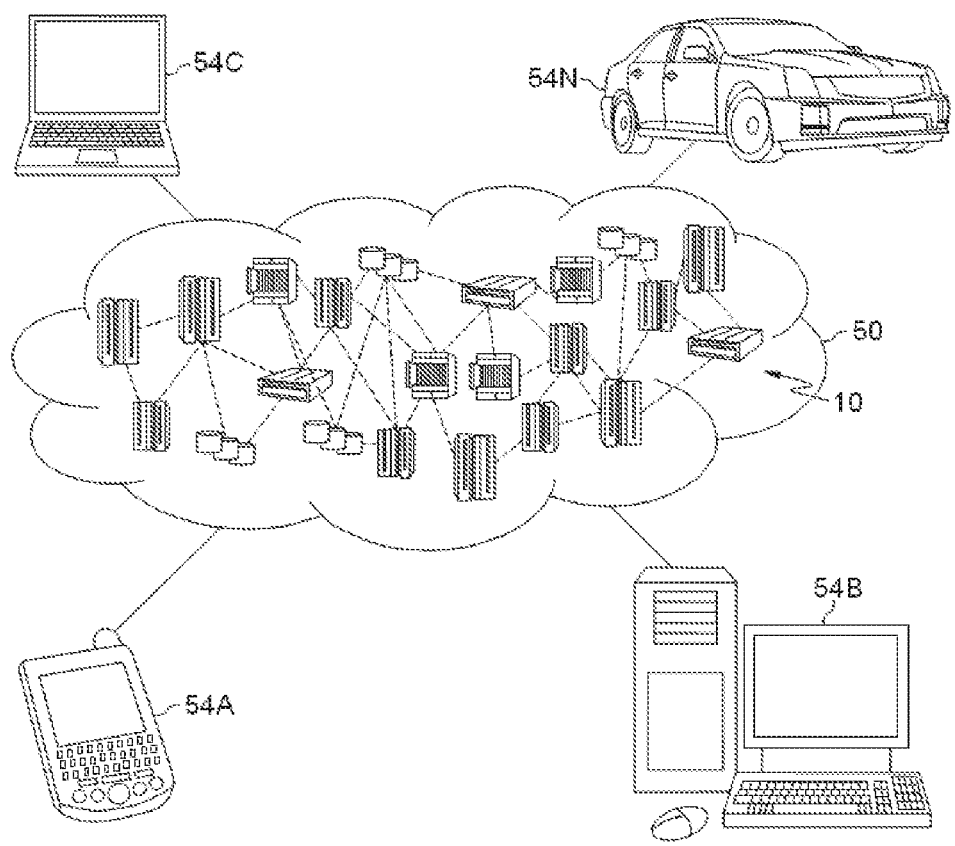
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof, This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
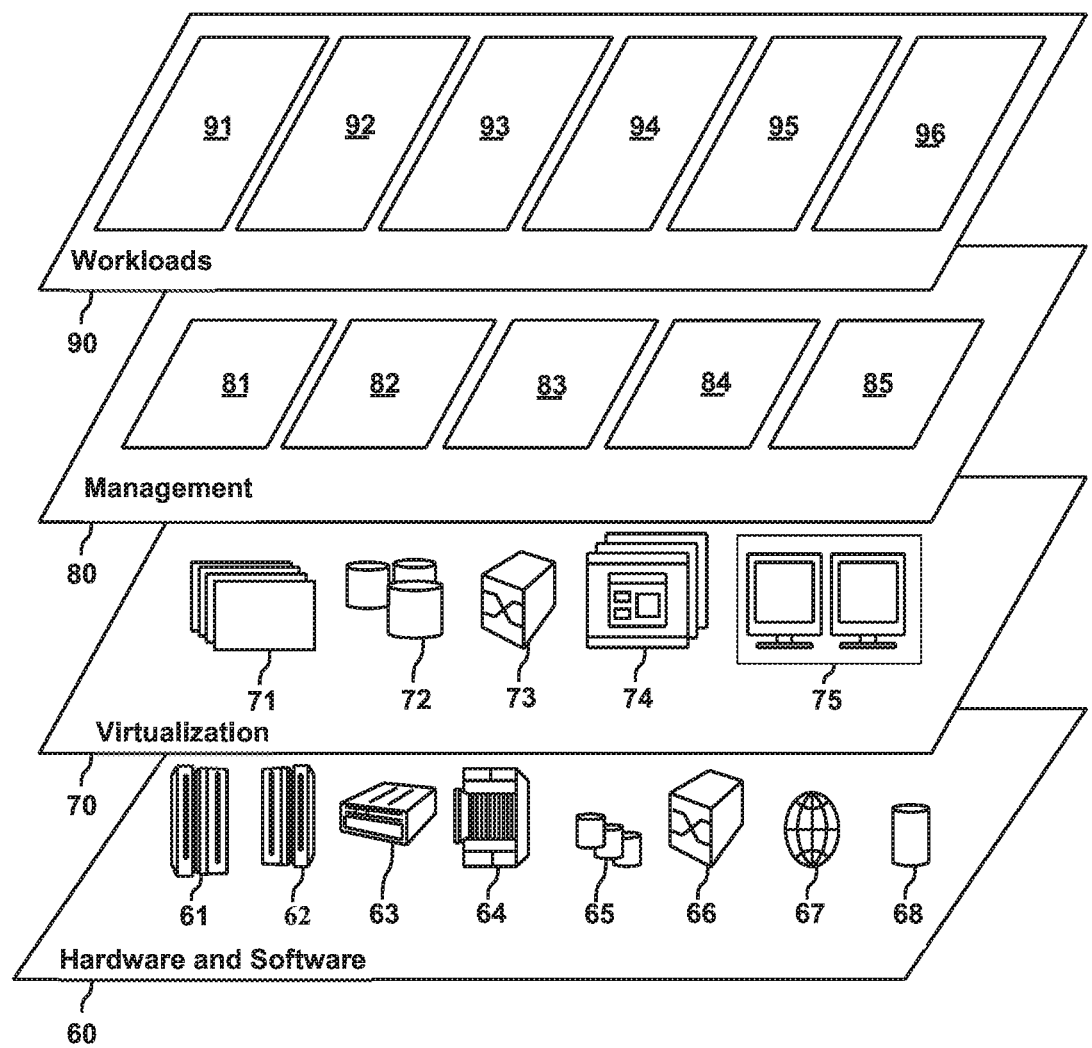
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-improving transferring in BOT conversation 96.

By present, how to dynamically improve transferring decision online is a big challenge. Too aggressive transferring decision might waste human agents' bandwidth, while too conservative transferring decision might cause frustrated conversation experiences. It can be a huge burden for designers to optimize models of transferring decision. The term "transferring decision" means a decision of transferring a conversation with a user from a BOT to a human agent when a condition happens. The condition can be, for example, the BOT can't understand a user input, or the user may be angry with replies of the BOT, etc. Those skilled persons in the art can defined the conditions.

To take benefits and avoid drawbacks, a reinforcement learning (RL) approach can be presented. Reinforcement learning is an area of machine learning, concerned with how software agents ought to take actions in an environment so as to maximize some notion of cumulative feedback. RL can be modeled as a Markov Decision Process (MDP). For more details about RL, it can be referred to "https://en.wikipedia.org/wiki/Reinforcement_learning". The basic idea of this disclosure is that a RL engine can determine whether a human agent is needed, and a user and the human agent can evaluate the determination of the RL engine, then be RL engine can self-improve the transferring decision based on the evaluations from the user and the human agent. Hereinafter some embodiments of the present invention will he explained in details to help to understand the present invention.

Figure 4:
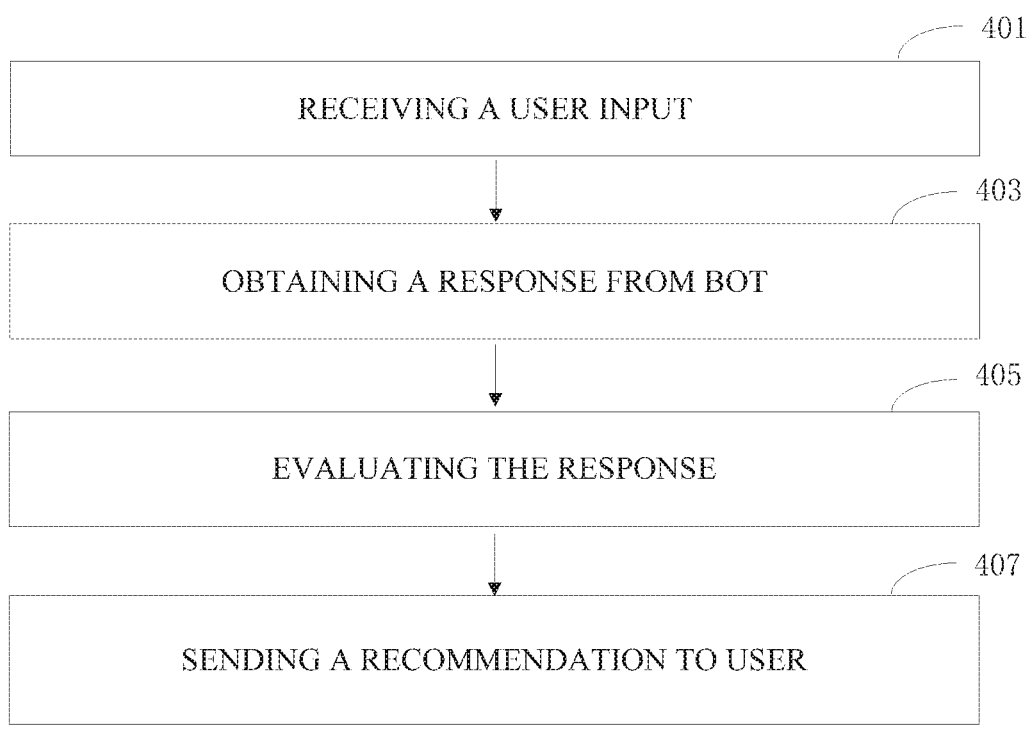
FIG. 4 shows a method of conversation transferring according to one embodiment of the present invention.

Now referring to FIG. 4, shown is a method of transferring according to one embodiment of the present invention. As shown in FIG. 4, at block 401, a user input can be received by one or more processing units. During the conversation of the BOT, the user can input questions or any other comments. The user input can be received by the BOT.

At block 403, a response from a conversation BOT responding to the user input can be obtained by one or more processing units. Responding to receiving the user input, the BOT can create a response to answer the user input. The response from the BOT can be obtained by one or more processing units.

At block 405, the response can be evaluated according to configured rules to determine whether a human agent needed by one or more processing units, wherein the evaluation according to at least one of the configured rules can be carried out by a trained engine of RL model. The configured rules include a set of critical rules and a set of influential rules. The critical rules and the influential rule can be defined by experts in this field.

The term "critical rule" means a rule to identify situations that the BOT definitely cannot provide expected responses to the user. The situations can comprise at least one of: (1) the BOT cannot understand the user input: (2) the BOT cannot determine exact intents of the user input as multiple intents are identified with very close confidence; (3) the BOT is not capable of handling the user input although the intent of the user input is clear, etc. The situations can be identified by analyzing runtime conversation logs (which include current response from the BOT) of the BOT system. In one embodiment, the analysis can leverage natural language processing(NLP) technologies. The above situations of critical rules are merely representative and they are not intended to be limiting. The BOT can be built based on an assistant computer program product or system (hereinafter "Assistant"). The Assistant can be a BOT platform that allows developers and non-technical users to collaborate on building conversational AI solutions. The graphical UI, powerful NLP and familiar developer features of Assistant allow a rapid creation of many BOTs from simple BOTs to complex enterprise grade solutions for customer services. The Assistant can be an example tool of BOT platforms. Any other proper analysis tools or platforms can be leveraged by the embodiments. It should be clear to a person in the art that the Assistant can be merely for the purpose of simplifying illustration and will not adversely limit the scope of the invention.

The term "influential rule" means a rule to identify situations that the BOT might not provide expected responses to the user. The situations can comprise at least one of: (a) negative sentiment is detected based on user input; (b) angry/disgust emotion is detected based on user input; (c) the BOT is stuck at a specific conversation node for several turns; (d) the user is predicted to be dissatisfied in the end based on ongoing conversation records, etc. The above situations of influential rules are merely representative and they are not intended to be limiting. The first two situations can be identified by analyzing the response from the BOT. Usually, a natural language understanding technology (NLU), can be leveraged to analyze the user input and return a value within a range of [−1, 1] wherein a positive value indicates positive sentiment and a negative value indicates negative sentiment. Besides, the analysis of the user input by the NLU can return a value within a range of [0, 1] representing the degree of angry/disgust emotion. A higher score means that the user input can be more likely to convey anger/disgust emotions. The situation (c) can be identified by analyzing the conversation logs (which include the current response from the BOT) from the BOT. The analysis can return a Boolean value, wherein 0 indicates the BOT is not stuck on a specific conversation node, while 1 indicates the BOT is stuck on a specific conversation node. The situation (d) can be identified with a deep learning model such as recurrent neural networks (RNN), LSTM, etc. The situation(d) also can be identified with a traditional learning model such as SVM, RandomForest, etc. The analysis of the situation (d) can return a Boolean value, wherein 0 indicates the user will not be dissatisfied at the end of the conversation, while 1 indicates that the user will be dissatisfied at the end of the conversation. Any other proper analysis tools or platforms may be leveraged by the embodiments. It should be clear to a person in the art that NLU is merely for the purpose of simplifying illustration and will not adversely limit the scope of the invention.

Referring hack to block 405, wherein the evaluating the response according to configured rules comprises determining whether none of the critical rules is broken; and in response to none of the critical rules is broken, determining whether the human agent is needed by the trained engine of RL model. As descripted above, BOT system logs will be analyzed to determine whether any of the critical rules has been broken. For example, an error in the BOT system logs indicates that BOT system fails to process user utterances. If any of the critical rules has been broken, the conversation between the BOT and the user can't be carried on any more, and the conversation will be switched from the BOT to the human agent. If none of the critical rules has been broken, whether the human agent is needed can be determined by the trained engine of the RL model. As descripted above, NLU or the deep learning model(s) can return a value within a range of [−1, 1] or a Boolean value, and the value within a range of [-1, 1] or a Boolean value can be fed into the engine of the RL model. The person in the field understands that RL is a function in fact, whose inputs are the values generated as above and the output is a Boolean value (0 indicates a human agent is needed and 1 indicates a human agent is not needed, or vise versa). The internal logic of the engine is trained offline and dynamically adjusted online. Another exemplary embodiment will be described to show how the engine of the RL model is trained offline and dynamically adjusted online hereinafter.

Now referring to block 407, a transferring recommendation can be sent to the user in response to determining the human agent is needed by one or more processing units. Once determining the human agent is needed, a transferring recommendation can be sent to the user. The user can accept the transferring recommendation or reject it. If the conversation is switched from the BOT to the human agent, as resources of the human agent can be limited, the user can have to wait a long time for service. The advantage of giving user a choice is that: if the user thinks the response from the BOT is acceptable, the user can refuse the transferring.

Figure 5:
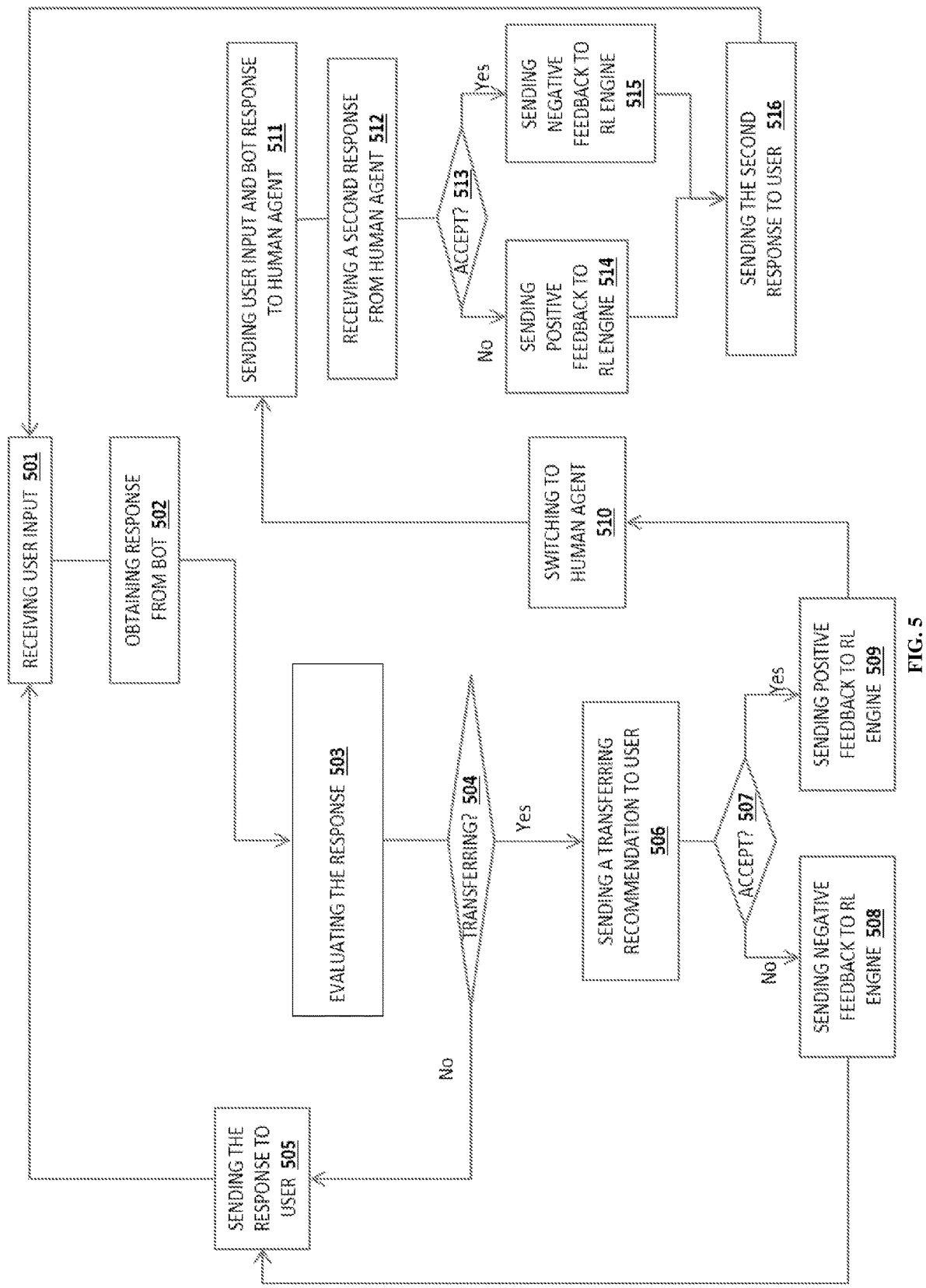
FIG. 5 shows a method of self-improving conversation transferring according to an embodiment of the present invention.
Figure 6:
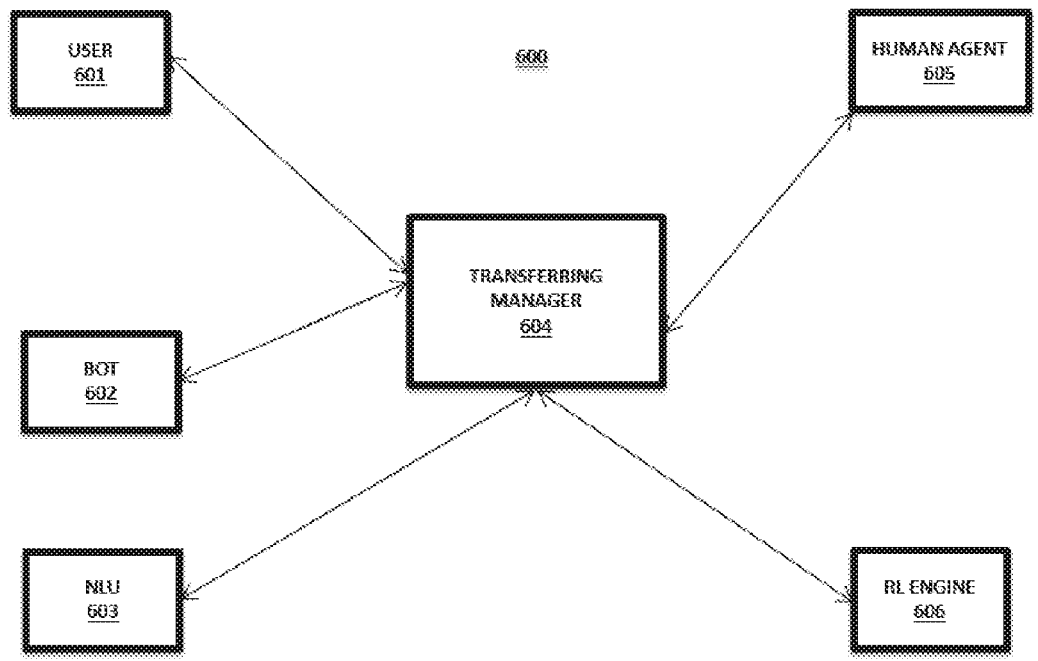
FIG. 6 shows an exemplary framework of self-improving conversation transferring according to an embodiment of the present invention.

For a better understanding of the present invention, embodiments of the present invention will be described in the following with reference to FIG. 5 and FIG. 6. FIG. 5 shows a method of self-improving conversation transferring according to an embodiment of the present invention. FIG. 6 shows an exemplary framework of a self-improving conversation transferring system according to an embodiment of the present invention. Combining with the framework 600, the method of conversation transferring is further described. The framework 600 includes a user 601, a BOT 602, a NLU (engine) 603, a transferring manager 604, a human agent 605 and a RI, engine 606. The BOT 602 can be built based on the Assistant. The term "user" can be a wide definition for the purpose of simplifying illustration, which can be referred to a user per se, a user application, a user application UI, or a client, etc. The term "human agent" can be a wide definition for the purpose of simplifying illustration, which can be referred to as customer service, a human agent application, a human agent UI, a customer service server, etc. The components of the framework 600 can be combined or decomposed, for instance, the RL engine 606 can be combined into the NLU 603 in one embodiment of the present invention, or the RL engine 606 and the NLU 603 can be combined into the transferring manager 604, or even the RL engine 606 and the NLU 603 and the BOT 602 can be combined into the transferring manager 604. The framework 600 can be used to explain the conversation transferring processes, and it should be clear to a person in the art that the following description is merely for the purpose of simplifying illustration and will not adversely limit the scope of the invention.

Now referring to FIG. 5 and FIG. 6, at block 501, the transferring manager 604 can receive a user input from the user 601. At block 502, the transferring manager 604 can send the user input to the BOT 602, and the BOT 602 can create a response according to the user input and send it to the transferring manager 604, thus the transferring manager 604 can obtain the response from the BOT 602. At block 503, the transferring manager 604 can leverage the NLU 603 and the RL engine 606 to evaluate the response. As described above, the NLU 603 and the RL engine 606 can evaluate the response according to configured rules to determine whether a human agent is needed. In one embodiment, the transferring manager 604 may need to obtain BOT system logs (which include the current response) from the BOT 602 and analyze for the critical rules. If the transferring manager 604 determines a transferring from the BOT 602 to the human agent 605 is needed at block 504, then a transferring recommendation can be created and sent to the user 601 at block 506. If the transferring is not needed, the transferring manager 604 can send the response to the user 601 at block 505.

At block 507, the transferring manager 604 can receive an answer from the user 601. In response to the user accepts the transferring recommendation, the transferring manager 604 can send a positive feedback to the RL engine 606 at block 509 and switch the conversation from the BOT 602 to the human agent 605 at block 510. Responding to the user refuses the transferring recommendation, the transferring manager 604 can send a negative feedback to the RL engine 606 at block 508.

At block 511, the transferring manager 604 can send the user input and the response to the human agent 605. The human agent 605 can create a second response based on the user input and the response from the BOT 602. The transferring manager 604 can determine whether the human agent 605 accepts the response based on the second response at block 513. Responding to determining the human agent 605 accepts the response from the BOT 602, the transferring manager 604 can send a negative feedback to the RL engine 606 at block 515, and responding to determining the human agent 605 refuses the response from the BOT 602, the transferring manager 604 can send a positive feedback to the RL engine at block 514. Then the transferring manager 604 can send the second response from the human agent 605 to the user 601 at block 516.

After the RL engine 606 has received the negative feedback(s) and the positive feedback(s), the RL engine 606 can be further trained with the negative feedback(s) and the positive feedback(s) to keep self-improving.

Figure 7:
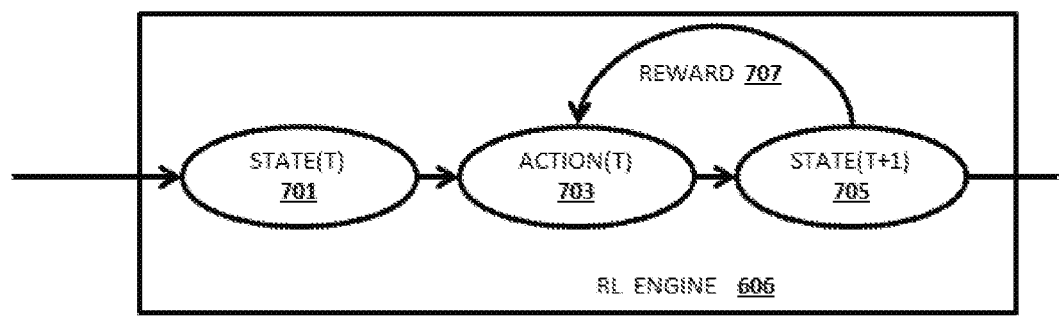
FIG. 7 shows the principle of a reinforcement learning engine according to an embodiment of the present invention.

The RL engine 606 can be available commercially, e.g., from OpenAI Gym, Kerus RL and TensorForce, etc. FIG. 7 shows the principle of the RL engine 606. The RL engine 606 interacts with its working environment (e.g. the BOT) in discrete time steps (T, T+1, . . . ). At each time T, the RL engine 606 selects an action 703 from the set of available actions (701, etc.), which can be subsequently sent to the environment. The environment moves to a new state (705, etc.) and the reward 707 associated with the transition is determined. The goal of the RL engine 606 can be to collect as many rewards as possible to keep self-improving.

To make this disclosure more explicit, the internal logic of the RL engine can be described by the following exemplary embodiment of the invention, but it is not intended to be limiting. For the purpose of simplifying illustration, the conditions (a) (i.e., sentiment), (c) (i.e. whether BOT is stuck) and (d) (i.e., whether the user is satisfied) of the influential rules can be considered. The analysis value of conditions (a) is in a range of [−1, 1] and needs to be discretized. Table 1 shows an exemplary embodiment of the discretization.

TABLE 1

| Analysis value of condition (a) | −1~−0.5 | −0.5~0 | 0~0.5 | 0.5~1 |
|---|---|---|---|---|
| Discretized sentiment value of condition (a) | 1 | 2 | 3 | 4 |

By combining with the analysis values of the conditions (a), (c) and (d), Table 2 is obtained, which shows 16 states of the present conversation according to the analysis values, actually a different state is a combination of different analysis values:

TABLE 2

| State | S1 | S2 | S3 | S4 | S5 | ... | S16 |
|---|---|---|---|---|---|---|---|
| Discretized sentiment value of condition (a) | 1 | 1 | 1 | 1 | 2 | | 4 |
| Analysis value of condition (c) | 0 | 0 | 1 | 1 | 0 | | 1 |
| Analysis value of condition (d) | 0 | 1 | 0 | 1 | 0 | | 1 |

In an embodiment, the actions can be defined as: A1: transfer, A2: not transfer. The reward can be defined as a value in range of [−1, 1.]. Then a Q Matrix of the RL engine as Table 3 needs to be trained, wherein Reward(Si, Aj) is the reward value when the state is Si and the action is Aj, and i and j are natural numbers.

TABLE 3

| State | S1 | S2 | S3 | ... | S16 |
|---|---|---|---|---|---|
| A1 | Reward (S1, A1) | Reward (S2, A1) | Reward (S3, A1) | | Reward (S16, A1) |
| A2 | Reward (S1, A2) | Reward (S2, A2) | Reward (S1, A2) | | Reward (S16, A2) |

A set of data of conversation records and human decision on transferring or not transferring as samples can be used to train the RL engine offline. The state of each conversation record can be analyzed as described above. For each state Si, for example, the number of "transfer" (A1) can be counted as c1 and the number of "not transfer" (A2) can be counted as c2, then the Reward(Si,Aj) can be calculated as: Reward(Si,Aj)=(c1−c2)/(c1+c2). The person in the field can calculate Reward(Si,Aj) in any other proper ways. Then the Q Matrix of the RL engine can be obtained, which means a trained RL engine can be obtained too and the trained RL engine can be ready for in the working environment.

When the trained RL engine online receives an evaluation request with the state Si, the trained RL engine can query the Q Matrix according to the Si. If Reward(Si, A1) >=Reward(Si, A2), the trained RL engine can give the recommendation of A1, otherwise the trained RL engine can give the recommendation of A2. In another embodiment, in order to increase the robustness of the Q Matrix and keep self-improving, the trained RL engine can give an opposite recommendation with a configured possibility (e.g. 10%): if Reward(Si, A1) >=Reward(Si, A2), the trained RL engine can give the recommendation of A2, otherwise the trained RL engine can give the recommendation of A1. Then the feedback from the user or the human agent can be collected to retrain the trained RL engine.

In order to retrain the trained RL engine, negative/positive feedbacks from the user or the human agent as descripted above can be sent to the online trained RL engine together with respective Si, N. The Q Matrix of the trained RL engine, for example, can be recalculated for each feedback as: Reward(Si, Aj)=(Reward(Si, Aj) * #total samples+feedback)/(#total samples+1). The #total samples can be the total number of training samples from the scratch, which includes the initial training samples and all the considered feedback samples for further training. The person in the field can calculate the Q Matrix in any other proper method in this way, the trained RL engine can keep self-improving by leveraging the negative/positive feedbacks from the user or the human agent.

It should be pointed out that in the above embodiments of the present invention are described with WA, NLU etc., however, it is only for a better understanding of the present invention thus will not adversely limit the scope of the invention. For example, a person skilled in the art could leverage the methods of this invention to any suitable platform, it will not be discussed in detail for the purpose of simplifying illustration.

It should be noted that the self-improving transferring in BOT conversation according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the users computer, partly on the users computer, as a stand-alone software package, partly on the user's computer and partly on a remote computer or entirely on the remote computer or server. In the latter condition, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by a device operatively coupled to one or more processing units, a user input from a user;
    obtaining, by the device, a first response from a conversation chat robot (BOT) responding to the user input;
    evaluating, by the device, the first response according to at least one of a set of configured rules to determine whether a human agent is needed, wherein the evaluation according to at least one of the set of configured rules is carried out by a trained engine of a reinforcement learning model; and
    sending, by the device, a transferring recommendation to the user in response to determining the human agent is needed,
    wherein the evaluating the first response according to at least one of the set of configured rules comprises:
        determining, by the device, whether no critical rules are broken; and
        in response to determining that no critical rules are broken, determining, by the device, whether the human agent is needed by the trained engine.

2. The computer-implemented method of claim 1, further comprising:
    in response to detecting the user accepts the transferring recommendation, switching, by the device, a conversation from the conversation BOT to the human agent.

3. The computer-implemented method of claim 2, further comprising:
    sending, by the device, the user input and the first response to the human agent; and
    receiving, by the device, a second response from the human agent.

4. The computer-implemented method of claim 3, further comprising:
    determining, by the device, whether the human agent accepts the first response based on the second response;
    in response to determining the human agent accepts the first response, sending, by the device, a negative feedback to the trained engine; and
    in response to determining the human agent refuses the first response, sending, by the device, a positive feedback to the trained engine.

5. The computer-implemented method of claim 3, further comprising:
    sending, by the device, the second response to the user.

6. The computer-implemented method of claim 1, further comprising:
    in response to detecting the user accepts the transferring recommendation, sending, by the device, a positive feedback to the trained engine; and
    in response to detecting the user refuses the transferring recommendation, sending, by the device, a negative feedback to the trained engine.

7. The computer-implemented method of claim 6, further comprising:
    training, by the device, the trained engine with the negative feedback or the positive feedback.

8. The computer-implemented method of claim 1, wherein the set of the configured rules include at least one critical rule and an influential rule.

9. The computer-implemented method of claim 1, further comprising at least one of in response to determining the human agent is not needed, sending, by the device, the first response to the user; or in response to determining the user refuses the transferring recommendation, sending, by the device, the first response to the user.

10. A computer system, comprising:
    a memory that stores computer executable components;
    a processing unit that executes the computer executable components stored in the memory, wherein the computer executable components comprise:
    at least one computer-executable component that:
    receives a user input from a user;
    obtains a first response from a conversational chat robot (BOT) responding to the user input;
    evaluates the first response according to at least one of a set of configured rules to determine whether a human agent is needed, wherein the evaluation according to at least one of the set of configured rules is carried out by a trained engine of a reinforcement learning model;

sends a transferring recommendation to the user in response to determining the human agent is needed;

determines whether the human agent accepts the first response based on a second response received from the human agent;

in response to determining the human agent accepts the first response, sends a negative feedback to the trained engine; and in response to determining the human agent refuses the first response, sends a positive feedback to the trained engine.

11. The computer system of claim 10, wherein the at least one computer-executable component also:

in response to the user accepting the transferring recommendation, switches a conversation from the conversational BOT to the human agent.

12. The computer system of claim 11, wherein the at least one computer-executable component also:

sends the user input and the first response to the human agent; and receives the second response from the human agent.

13. The computer system of claim 10, wherein the at least one computer-executable component also:

in response to the user accepting the transferring recommendation, sends a positive feedback to the trained engine; and in response to the user refusing the transferring recommendation, sends a negative feedback to the trained engine.

14. A computer program product facilitating self-improving transferring in a chatbot conversation, the computer program product comprising a computer readable storage medium having program instructions embodied therewith, the program instructions executable by a processing component to cause the processing component to:

receive, by the processing component, a user input from a user;

obtain, by the processing component, a first response from a conversational chat robot (BOT) responding to the user input;

evaluate, by the processing component, the first response according to at least one of a set of configured rules to determine whether a human agent is needed, wherein the evaluation according to at least one of the set of configured rules is carried out by a trained engine of a reinforcement learning model;

send, by the processing component, a transferring recommendation to the user in response to determining the human agent is needed;

determine, by the processing component, whether the human agent accepts the first response based on a second response received from the human agent;

in response to determining the human agent accepts the first response, send, by the processing component, a negative feedback to the trained engine; and in response to determining the human agent refuses the first response, send, by the processing component, a positive feedback to the trained engine.

15. The computer program product of claim 14, wherein the program instructions further cause the processing component to:

in response to the user accepting the transferring recommendation, switch a conversation from the conversational BOT to the human agent.

16. The computer program product of claim 15, wherein the program instructions further cause the processing component to:

send the user input and the first response to the human agent; and receive the second response from the human agent.

17. The computer program product of claim 14, wherein the program instructions further cause the processing component to:

in response to the user accepting the transferring recommendation, send a positive feedback to the trained engine; and in response to the user refusing the transferring recommendation, send a negative feedback to the trained engine.

* * * * *